UNITED STATES PATENT OFFICE.

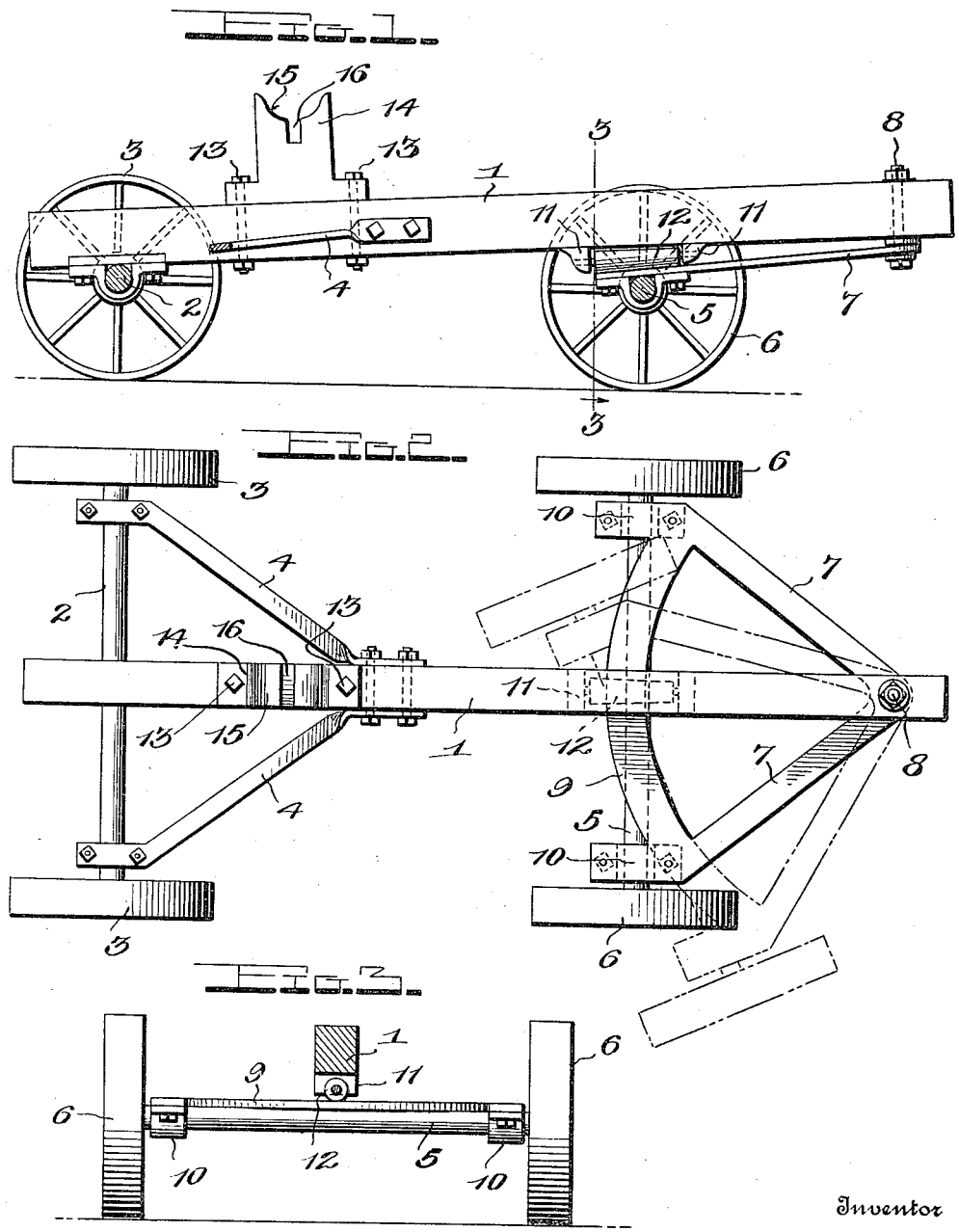

FRANCIS M. ALEXANDER, OF WINTERSET, IOWA.

TRUCK.

1,150,727.     Specification of Letters Patent.     Patented Aug. 17, 1915.

Application filed September 21, 1914. Serial No. 862,782.

*To all whom it may concern:*

Be it known that I, FRANCIS M. ALEXANDER, a citizen of the United States, residing at Winterset, in the county of Madison and State of Iowa, have invented certain new and useful Improvements in Trucks; and I do declare the following to be a full, clear, and exact description of the invention, such as will enable others skilled in the art to which it appertains to make and use the same.

This invention relates to new and useful improvements in trucks and more particularly to a device known as a wrecking truck.

The primary object of the invention is to provide a device of this character which may be readily pressed into service for use in towing vehicles having broken axles or spindles.

A further object of the invention resides in providing a device which may be used in connection with a motor vehicle to utilize the power of the latter in towing.

A further object of the invention resides in providing a device which is simple and durable in construction, inexpensive to manufacture and one which will be very efficient and useful in operation.

With these and other objects in view the invention consists in the novel features of construction, combination and arrangement of parts as will be hereinafter referred to and more particularly pointed out in the specification and claims.

In the accompanying drawing forming a part of this application: Figure 1 is a longitudinal section through a device constructed in accordance with my invention; Fig. 2 is a plan view showing in dotted lines the position of the front axle when the hounds are mounted on their pivot point; Fig. 3 is a transverse section as seen on line 3—3 of Fig. 1.

In describing the invention I shall refer to the drawing in which similar reference characters designate corresponding parts throughout the several views and in which—

1 designates a reach or beam which has supported adjacent its rear end a rear axle 2 carrying the rear supporting wheels 3. This rear axle is supported in position by means of the rear hounds or rearwardly diverging bracing bars 4. A front axle 5 carrying front supporting wheels 6 is provided and supported in an improved manner as will be presently described.

Rearwardly diverging hounds 7 which together form a V-shaped member are provided, the same being pivoted at the point of junction on a king bolt 8 extending vertically through the beam or reach 1 immediately adjacent its front end. The rear ends of these hounds 7 are connected with an arcuate bar 9 at the ends of which are formed bearings 10 which support therein the front axle 5.

The reach or beam 1 is inclined somewhat upwardly toward its forward end and formed on the under face of this reach or beam intermediate of its ends are the bearings 11 between which is revolubly mounted a roller 12. This roller which extends longitudinally of the beam 1 tapers smaller toward its forward end and receives in contact therewith the arcuate bar 9 connecting the hounds 7. It will thus be seen that the forward end of this reach or beam is properly supported and in view of the connection between the roller and the arcuate bar 9, the front axle may be readily directed to the right or left, as desired.

Removably secured by means of bolts 13 to the top face of the reach or beam 1 adjacent its rear end is a supporting block 14 which is concaved in its upper face as indicated at 15 and slotted as at 16. The axle of a vehicle, particularly a motor vehicle may be readily received in this grooved and slotted face of the block or what is known to the art as a crotch. If it is the front spindle or wheel of a motor vehicle that is broken and the axle is mounted in the member 14 the vehicle may be driven in on its own power. If it should be the rear axle shaft or wheel that is broken the vehicle will have to be drawn or towed in with power other than its own. In any instance, however, the block or crotch 14 is well adapted to receive therein an axle to properly support the vehicle for towing the same to the repair shop and is self guiding.

From the foregoing it will be seen that I have provided a simple, inexpensive and efficient means for carrying out the objects of the invention and while I have particularly described the elements best adapted to perform the functions set forth, it is obvious that various changes in form, proportion and in the minor details of construction may be resorted to, within the scope of the appended claims, without departing from the spirit or sacrificing any of the principles of the invention.

Having thus described my invention, what I claim is:

1. A truck of the class described comprising a longitudinal beam, an axle supporting means adjacent the rear end thereof, rear supporting means for said beam, a front axle having supporting wheels thereon, rearwardly diverging hounds pivoted at the forward ends to the forward end of the beam and connected with said axle, an arcuate member connecting the rear ends of said hounds, and anti-friction means provided on the under face of said beam for engagement with said arcuate member.

2. A truck of the class described comprising a longitudinal beam, an axle supporting member mounted thereon adjacent the rear end thereof, a rear axle and supporting wheels carried at the rear end of said beam, a front axle with supporting wheels thereon, rearwardly diverging hounds pivoted at their forward ends to the under face of said beam at the forward end of the latter, the rear ends of said hounds having connection with said front axle, an arcuate bar connecting the rear ends of said hounds and a longitudinally extending roller mounted on the under face of said beam and having contact with said arcuate bar.

3. In a wrecking truck, a longitudinally extending beam, means provided at the rear end thereof for supporting a vehicle axle, a rear axle with supporting wheels thereon mounted at the rear portion of said beam, a front axle with supporting wheels thereon, rearwardly divergent hounds pivotally connected at their forward ends to the under face of said beam adjacent the forward end of the latter, the rear ends of said hounds having connection with said axle, an arcuate bar connecting the rear ends of said hounds, and a longitudinally extending roller mounted on the under face of said beam and having rolling contact with said arcuate bar, said roller tapering smaller toward its forward end to aid in the disposition of the axle to its various positions with respect to the beam.

In testimony whereof I have hereunto set my hand in presence of two subscribing witnesses.

FRANCIS M. ALEXANDER.

Witnesses:
ELMER ORRIS,
OTTO MACUMBER.

Copies of this patent may be obtained for five cents each, by addressing the "Commissioner of Patents, Washington, D. C."